United States Patent
Clements et al.

(10) Patent No.: US 9,774,114 B1
(45) Date of Patent: Sep. 26, 2017

(54) SURFACE-MOUNT-TECHNOLOGY-COMPATIBLE ELECTRICAL CONTACT

(71) Applicant: Microsoft Technology Licensing, LLC, Redmond, WA (US)

(72) Inventors: Bradley E. Clements, Fort Collins, CO (US); Gabriel Pirie, Seattle, WA (US); Perry H. Pierce, Fort Collins, CO (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/241,172

(22) Filed: Aug. 19, 2016

(51) Int. Cl.
| H01R 12/57 | (2011.01) |
| H01R 12/62 | (2011.01) |
| H01R 13/26 | (2006.01) |
| G06F 3/0354 | (2013.01) |

(52) U.S. Cl.
CPC ......... *H01R 12/62* (2013.01); *G06F 3/03545* (2013.01); *H01R 12/57* (2013.01); *H01R 13/26* (2013.01)

(58) Field of Classification Search
CPC ......... H01R 12/57; H01R 12/62; H01R 13/26
See application file for complete search history.

(56) References Cited

U.S. PATENT DOCUMENTS

| 6,231,394 | B1 * | 5/2001 | Schnell | ............... | G06K 7/0021 439/630 |
| 6,506,064 | B1 | 1/2003 | Wu | | |
| 7,042,318 | B2 | 5/2006 | Barnes et al. | | |
| 7,223,107 | B2 | 5/2007 | Mao | | |
| 7,357,665 | B1 * | 4/2008 | Yan | ............... | H01R 13/2442 439/500 |
| 7,364,477 | B2 | 4/2008 | Vance | | |
| 7,806,739 | B2 * | 10/2010 | Hu | ............... | H01R 13/2442 439/862 |

(Continued)

FOREIGN PATENT DOCUMENTS

EP 0350710 1/1990

OTHER PUBLICATIONS

"Basics Connectors for SMT production Through Hole Reflow", Retrieved on: Apr. 26, 2014 Available at:https://www.phoenixcontact.com/local_content_pdf/pdf_eng/52004352_EN_DE_LR.pdf, pp. 1-24.

*Primary Examiner* — James Harvey
*Assistant Examiner* — Oscar C Jimenez
(74) *Attorney, Agent, or Firm* — Arent Fox LLP (57) ABSTRACT

A contact to provide an electrical connection between two circuit boards, such as a rigid circuit board and a flexible circuit board installed in a container, such as an electronic stylus or a cellular telephone. The contact head generally has the shape of an inverted spoon, which allows the contact head to slide smoothly onto a desired electrical contact pad on the flexible circuit board. The contact has a unitary design, including a spring, which reduces the likelihood of damage to the flexible circuit board or to the contact when the rigid circuit board is installed in the electronic stylus. The spring design reduces the likelihood that the contact will be bent when the rigid circuit board is installed, and also allows the contact to be balanced, which is advantageous for wave-soldering operations. The contact also has a pick surface, which is useful in vacuum pick-and-place operations.

20 Claims, 8 Drawing Sheets

(56) References Cited

U.S. PATENT DOCUMENTS

| | | | |
|---|---|---|---|
| 8,192,206 B1* | 6/2012 | Ju | H01R 12/57 |
| | | | 439/66 |
| 8,497,429 B2 | 7/2013 | Seidler | |
| 8,517,777 B2* | 8/2013 | Haans | H01R 12/57 |
| | | | 439/816 |
| 8,840,433 B2 | 9/2014 | Ho et al. | |
| 9,004,937 B2 | 4/2015 | Tarulli | |
| 9,099,820 B2 | 8/2015 | Beer | |
| 9,164,597 B2 | 10/2015 | Lee et al. | |
| 2004/0048498 A1 | 3/2004 | Huang et al. | |
| 2008/0233810 A1* | 9/2008 | Chuang | H01R 12/57 |
| | | | 439/884 |
| 2009/0051673 A1 | 2/2009 | Yu et al. | |
| 2010/0015824 A1* | 1/2010 | Wang | H01R 13/2464 |
| | | | 439/108 |
| 2011/0151720 A1* | 6/2011 | Xie | H01R 12/57 |
| | | | 439/626 |
| 2011/0287641 A1* | 11/2011 | Zhu | H01R 12/55 |
| | | | 439/83 |
| 2011/0312220 A1* | 12/2011 | Zhu | H01R 12/707 |
| | | | 439/626 |
| 2012/0052733 A1* | 3/2012 | Zhu | H01R 13/41 |
| | | | 439/626 |
| 2013/0269995 A1 | 10/2013 | Meng et al. | |
| 2014/0045389 A1* | 2/2014 | Yoshikawa | H01R 13/24 |
| | | | 439/786 |
| 2015/0038001 A1* | 2/2015 | Kiryu | H01R 12/714 |
| | | | 439/370 |
| 2015/0116291 A1 | 4/2015 | Leung et al. | |
| 2015/0286310 A1 | 10/2015 | Chang et al. | |

* cited by examiner

SURFACE-MOUNT-TECHNOLOGY-COMPATIBLE ELECTRICAL CONTACT

BACKGROUND

An electronic stylus may have two or more circuit boards, one of which is typically a rigid, flat circuit board which extends across the inner diameter of the stylus and which extends lengthwise through the stylus, and another of which is typically a flexible circuit board, which curls around the curved inner surface of the stylus and which also extends lengthwise through the stylus. Typically, the flexible circuit board is inserted into the stylus first, and then the rigid circuit board is inserted into the stylus. The rigid circuit board typically has two or more connectors or contacts so that, when the rigid circuit board is inserted into the stylus, the contacts press against conductive pads on the flexible circuit board, thereby creating one or more electrical paths so that the two circuit boards are in communication with each other.

Some types of contacts are rigid and, when the rigid circuit board is being inserted, these rigid contacts may make insertion difficult and/or may scrape against and damage the flexible circuit board, particularly the conductors on the flexible circuit board. Other types of contacts are susceptible to bending and twisting and may become temporarily or permanently misaligned, such as when a "twist-to-lock" operation is being performed during assembly or during battery replacement. The misaligned contacts may not contact their designated pads, in which case the two boards may not be able to communicate, and the stylus may not function properly.

Further, the shape of some types of contacts is unsuitable for a vacuum "pick-and-place" automated process of placing surface mount technology (SMT) components on circuit boards. Such contacts require a separate or manual process for placing and fastening those components to the circuit board.

SUMMARY

Electrical contacts are described herein that provide board-to-board electrical paths and that are compatible with the pick-and-place automated process, thereby simplifying, accelerating, and/or reducing the cost of, the automated assembly of SMT circuit boards. The contacts are particularly useful with, but not limited to, board installations in a tubular-shaped device, such as an electronic stylus, or a somewhat rectangular-shaped device, such as a cellular telephone. In addition, the contacts described herein are less susceptible to permanent deformation from bending and twisting during assembly. Further, the contacts described herein, when mounted on one circuit board, reduce or eliminate the likelihood of damage to the other circuit board.

An electrical contact disclosed herein has a contact head, a spring connected to the contact head, a frame connected to the spring, and two feet connected to the frame. The spring provides a pick surface, and the contact is balanced, which provides for pick-and-place automated assembly operations. The contact also allows a low profile SMT component to be placed under the frame. Also, a split beam at one end of the spring allows for a tall SMT component to be placed under the contact head.

A contact assembly disclosed herein has two contacts, each contact having a contact head, a spring connected to the contact head, a frame connected to the spring, and a foot connected to the frame. An insulated spacer joins the two contacts together. The insulated spacer provides a pick surface, and the contact assembly is balanced, which provides for pick-and-place automated assembly operations. The contact assembly also allows a low profile SMT component to be placed under the frame.

Another contact assembly disclosed herein has two or more pairs of contacts, each contact of a pair of contacts has a contact head, a spring connected to the contact head, a frame connected to the spring, and a foot connected to the frame. An insulated spacer joins two contacts together as a pair, and joins the pairs together. The insulated spacer provides two or more pick surfaces, and the contact assembly is balanced, which provides for pick-and-place automated assembly operations. The contact assembly also allows a low profile SMT component to be placed under the frame.

This Summary is provided to introduce a selection of concepts in a simplified form that are further described below in the Detailed Description. This Summary is not intended to identify key features or essential features of the claimed subject matter, nor should this Summary be used to limit the scope of the claimed subject matter. Furthermore, the claimed subject matter is not limited to implementations that solve any or all disadvantages noted in any part of this disclosure. In addition, it is not necessary to use all techniques described herein in order to obtain any benefit or benefits described herein. Also, it is not necessary to obtain all benefits described herein in order to obtain any benefit described herein; in other words, one can choose to obtain only one benefit described, or to obtain more than one of the benefits described herein, and can choose to implement a design that provides the chosen benefit(s), and to not implement other designs described herein.

DETAILED DESCRIPTION

Contacts and contact assemblies are disclosed herein that provide electrical connections between circuit boards, such as electrical contacts between rigid circuit boards and flexible circuit boards, such as may be used in a tubular-shaped device, such as an electronic stylus. The contacts and contact assemblies are also suitable for vacuum pick-and-place operations.

For the benefit of increasing readability, by reducing the recitation and repetition of inclusive terms, the terms "may be, but is not limited to," "can be, but is not limited to," "by way of example, and not of limitation," "such as, but not limited to," "for example, and not as a limitation," and similar inclusive expressions, are abbreviated herein as "may be," "can be," "by way of example," "such as," and "for example."

Also, where there are plural items having the same reference number, they may be referred to herein collectively with that reference number, or individually with that reference number, as the context might require. For example, contacts 220A, 220B, 220C may be referred to collectively as contacts 220, or individually as contact 220, as the context might require.

Figures 1A, 1B:
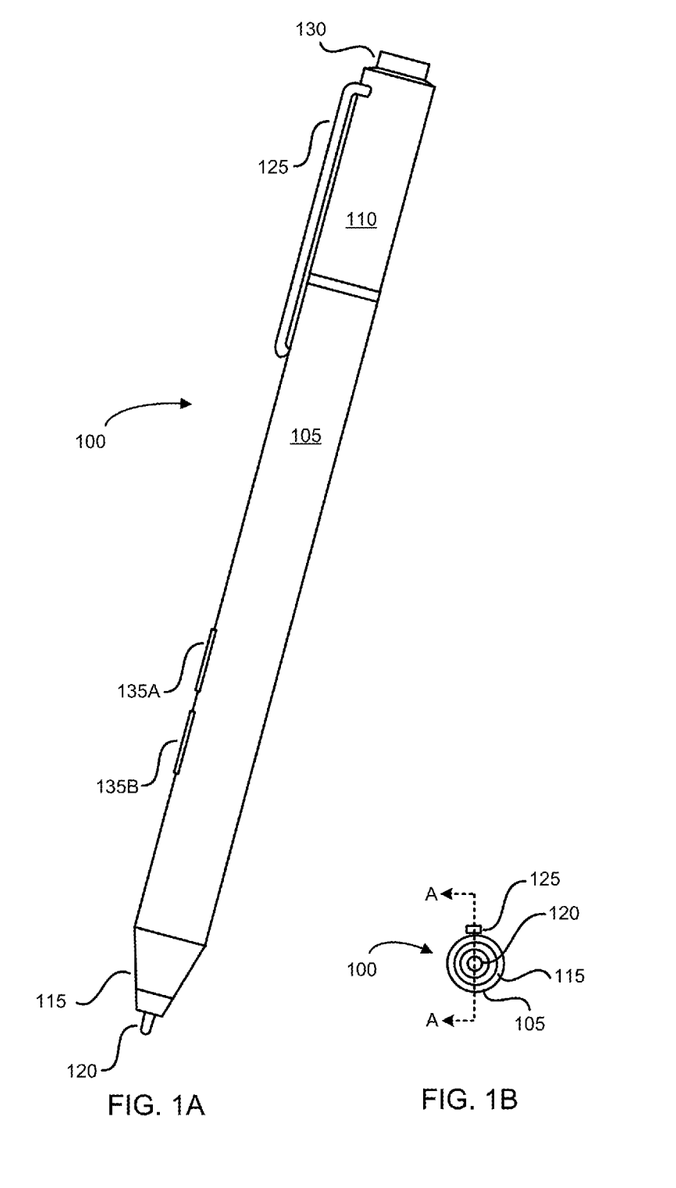
FIG. 1A is an illustration of an exemplary electronic stylus.
FIG. 1B is an end view of the exemplary electronic stylus showing sectional line A-A.

Turning now to the drawing, FIG. 1A is an illustration of an exemplary electronic stylus 100 and FIG. 1B is an end view of the exemplary electronic stylus 100 showing sectional line A-A. The electronic stylus 100 has a barrel 105, a cap 110, an end 115, a tip 120, an optional clip 125, and one or more optional buttons that can be pressed by a user, such as optional top cap button 130 and optional barrel buttons 135A, 135B. These optional buttons 130, 135 may be used by the user to select various functions or operations, such as, "power on" or "power off", "right click", "erase", etc. The electronic stylus 100 (also referred to herein simply as a "stylus"), has circuitry and sensors therein for performing various functions, such as determining, or providing information for determining, the position of the stylus on the display screen of a tablet computer, a laptop computer, electronic game, or the signature capture screen of a credit card point of sale device, the velocity of the stylus across the display screen, whether the stylus is in contact with, or removed from, the display screen, etc.

The dimensions of the electronic stylus 100 are for convenience of illustration. The electronic stylus 100 may be longer or shorter, or may be thicker or thinner, and the ratio of the length of the barrel 105 to the cap 110 may be larger or smaller than that shown.

Figure 2:
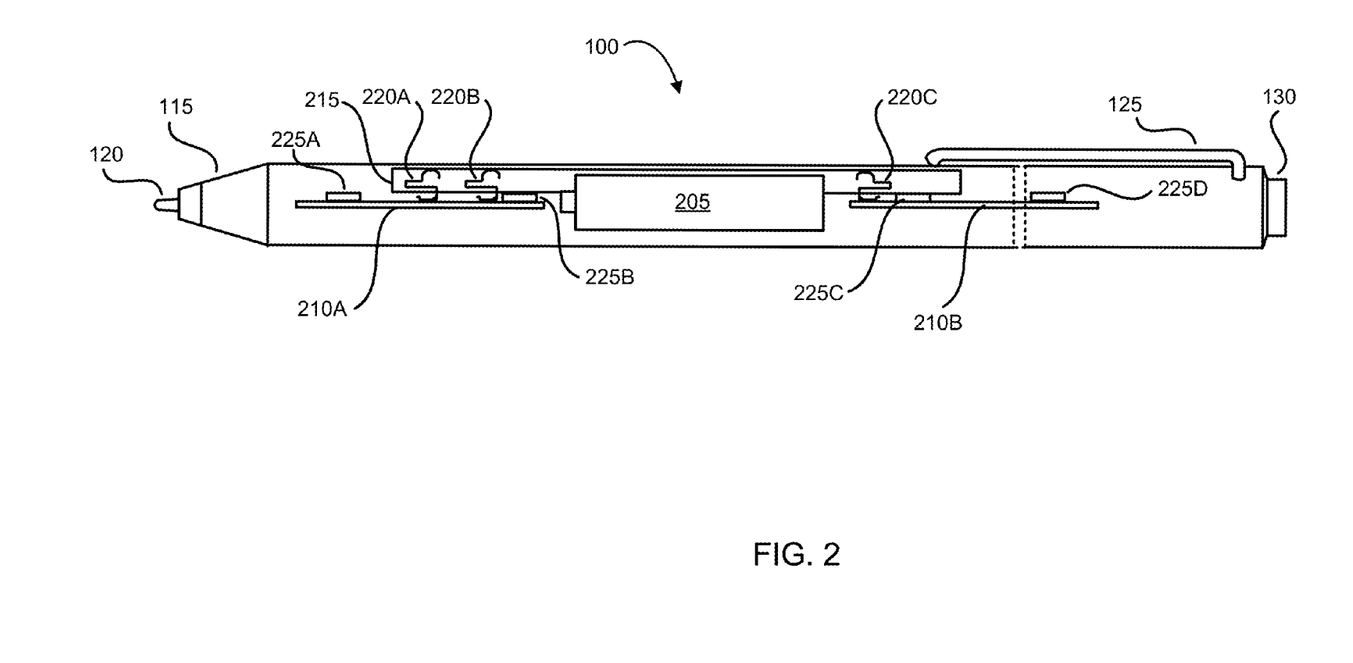
FIG. 2 is a cutaway view along the sectional line A-A shown in FIG. 1B showing exemplary various components of an electronic stylus.

FIG. 2 is a cutaway view along the sectional line A-A shown in FIG. 1B showing exemplary various components of an electronic stylus 100, such as a battery 205, rigid circuit boards 210A, 210B, a flexible circuit board 215, and surface mount technology (SMT) devices 225A-225D. The circuit boards 210 and 215 can have one or more printed circuit conductors (sometimes referred to as "printed circuit wires" or "printed circuit traces"), electrical contact pads, SMT devices 225, and/or components thereon. The end 115 and the tip 120 can also have one or more sensors or lights. Although only a single battery 205 is shown, such as a AA or AAA battery, the battery 205 may be one or more "button" batteries (also sometimes called "coin" batteries or "watch" batteries) connected in series. The size, position, and polarity shown for the battery 205 are merely exemplary. For example, the battery 205 may be placed closer to the tip 120 or closer to the cap 130 to achieve a desired balance or "feel" for the electronic stylus 100. The barrel 105 and the cap 110 may be separated for replacement of the battery 205.

The electronic stylus 100 may perform one or more desired functions. For example, the electronic stylus 100 may detect its position on a display screen (not shown) and transmit that information to the device (not shown) controlling the display screen. The electronic stylus 100 may vibrate, turn a light on or off, and/or make a sound when it detects or receives a signal from the display screen, or detects a pattern or a change in the pattern on the display screen. The electronic stylus 100 may also allow the user to operate one or more optional buttons 130, 135 to control the operation of the electronics stylus 100 and/or to send signals to the device controlling the display screen. In order to accomplish these desired functions, the electronic stylus 100 may have two or more conventional, rigid circuit boards 210A, 210B thereon, with each circuit board 210 having one or more SMT devices 225A, 225B, 225C, 225D and/or other components mounted thereon. The circuit boards 210 can, for example, have sensors and/or wiring to determine when an optional button 135A, 135B is pressed or released by the user or is slid into one position or another by the user, to determine the orientation of the electronic stylus 100, to determine the acceleration of the electronic stylus 100, such as when the user is writing or drawing with the electronic stylus 100, etc.

In the exemplary electronic stylus 100, there are two conventional, rigid circuit boards 210 which communicate with each in order to accomplish the various desired functions. The two rigid circuit boards 210 could communicate with each other via small wires, a small cable or a flat cable (not shown), which might run alongside the battery 205 and which have sufficient length to allow the barrel 105 and the cap 110 to be separated for replacement of the battery 205. Such small wires or cables, however, are prone to damage, and the connection between the wiring pads or traces on the board and/or an individual wire can be damaged during such battery replacement.

A flexible circuit board, such as flexible circuit board 215, may be used to connect the rigid circuit boards 210A, 210B. In order to provide the electrical paths between the rigid circuit boards 210 and the flexible circuit board 215 so-called "Pogo" pins (not shown) have been used. Pogo pins, however, are rigid, are subject to misalignment, can damage the printed circuit conductors or electrical contact pads on the flexible circuit board during assembly or during battery installation or replacement, can become detached from the printed circuit conductors to which they are attached during assembly or battery installation or replacement, and/or can cause the printed circuit conductors to which they are attached to detach from the rigid circuit board during assembly or battery installation or replacement. Pogo pins also use a large amount of space on the rigid circuit board and do not accommodate an SMT component being placed underneath. A Pogo pin is generally mounted in the center (from a side-to-side viewpoint) of the rigid circuit board so that it is aligned radially toward a corresponding electrical contact pad on the flexible circuit board.

As shown, contacts 220A and 220B provide electrical connections between rigid circuit board 210A and flexible circuit board 215, and another contact 220C provides an electrical connection between the flexible circuit board 215 and the rigid circuit board 210B. The contacts 220 reduce or eliminate the likelihood of damage to the circuit boards 210, 215 during assembly or battery installation or replacement. Although three contacts 220A, 220B, 220C are shown, more (or fewer) contacts may be used as desired and are contemplated.

If a single communication path is desired between a circuit board 210A, 210B and the circuit board 215, then a single contact 220 on each circuit board 210 can provide that communication. If two or more communication paths are needed between circuit board 210A or 210B and a circuit board 215 then two or more contacts 220 can be used. The two or more contacts 220 may be placed in series lengthwise along the electronic stylus 100, with each contact 220 extending radially outwardly from the centerline of the electronic stylus 100.

The circuit board 215 may communicate with the circuit board 210A, and/or may be a conduit which conveys power and/or communications between circuit boards 210A and 210B. For example, contact 220A may be used to provide for communication between rigid circuit board 210A and flexible circuit board 215, and contacts 220B and 220C may be used to provide for communication between rigid circuit board 210A and rigid circuit board 210B via, for example, a circuit trace on flexible circuit board 215.

Figure 3:
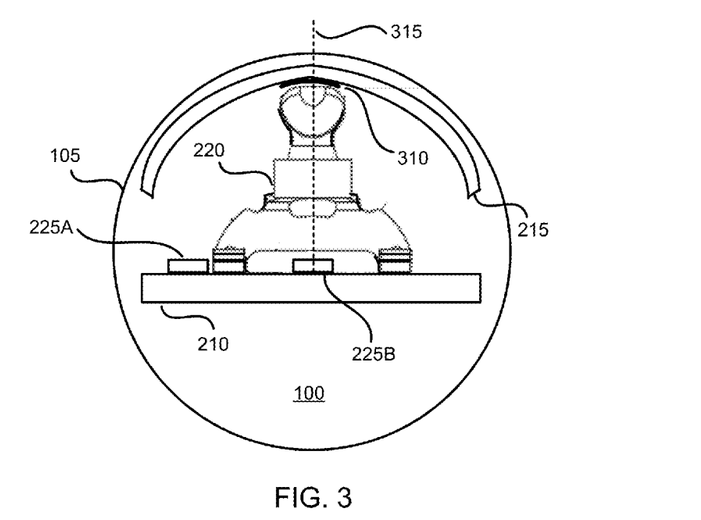
FIG. 3 is an illustration of an end view looking into the electronic stylus and showing an exemplary contact.

FIG. 3 is an illustration of an end view looking into the electronic stylus 100 and showing a contact 220, and also showing the rigid circuit board 210, the flexible circuit board 215, and exemplary SMT devices 225A, 225B. The contact 220 provides an electrical path between the circuit board 210 and the circuit board 215 which allows the circuit boards 210, 215 to exchange information, instructions, and/or power. One contact 220 is shown; other contacts, which may be behind the contact 220, are not visible in this end view. As will become apparent from the discussion below, the contacts 220 described herein avoid the problems caused by the use of small cables and wires and Pogo pins.

Figure 4A:
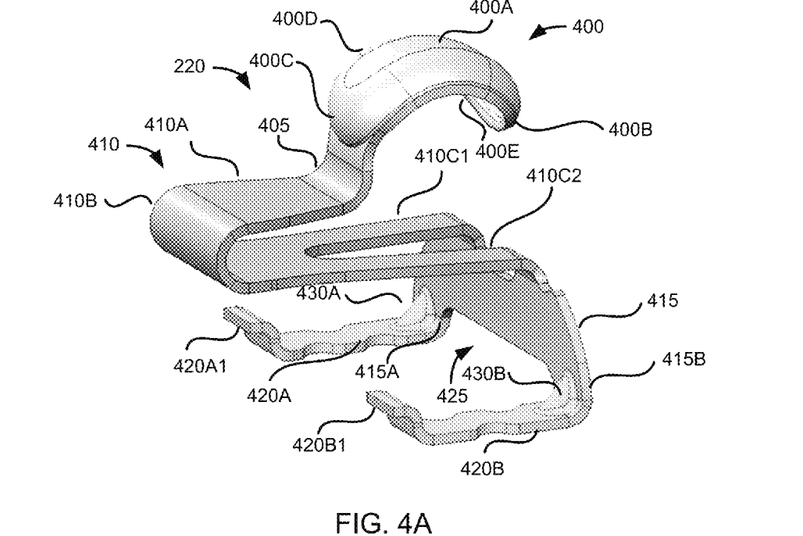
FIGS. 4A and 4B are perspective and side view illustrations, respectively, of an exemplary contact.
Figure 4B:
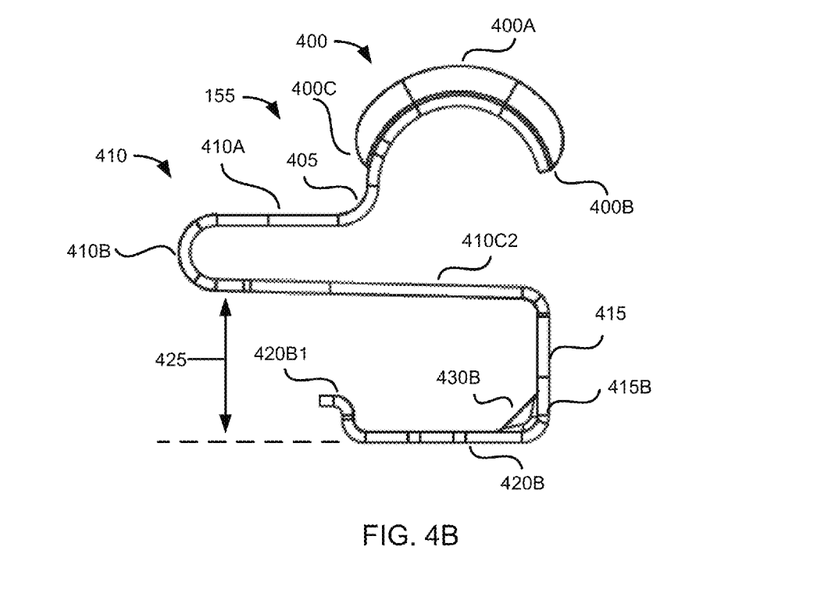
Figure 4C:
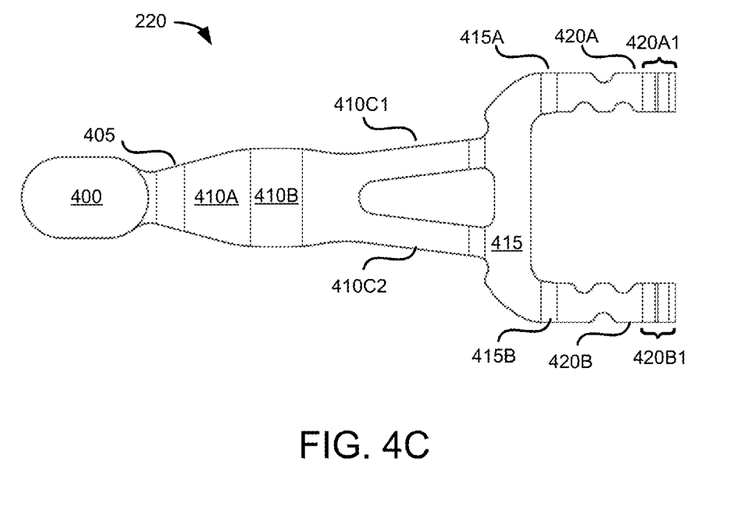
FIG. 4C is an illustration of an exemplary stamped contact prior to forming.

FIGS. 4A and 4B are perspective and side view illustrations, respectively, of an exemplary contact 220, and FIG. 4C is an illustration of the exemplary stamped contact 220 prior to forming. The contact 220 is conductive and has a contact head 400, a spring 410, a connecting section 405 between the contact head 400 and the spring 410, a frame 415 (which may also be referred to herein as a "bridge") with legs or supports 415A, 415B, and feet 420A, 420B with respective tips 420A1, 420B1. The feet 420A, 420B are soldered to respective electrical contact pads (not shown) on the rigid circuit board 210 by, for example, wave soldering. Therefore, when the rigid circuit board 210 is inserted into the stylus 100, the contact head 400 is in contact with the electrical contact pad 310 on the flexible circuit board 215, thereby establishing an electrical communication path between the two circuit boards. The contact head 400 is approximately centered between the feet 420A, 420B. This balances the contact 220 so that it does not tend to fall toward one side or the other prior to being soldered in place, and also provides that the contact 220 is aligned radially inward from the electrical contact pad 310, as indicated by the radial line 315 (FIG. 3). It will be seen (FIG. 4B) that the contact 220 has an exaggerated "S" shape.

The contact head 400 is preferably curved in at least one dimension, e.g., along a front-to-back line, i.e., from its top or peak 400A the surface of the contact head 400 slopes downward toward its front end 400B and also slopes downward toward its rear end 400C. More preferably, the contact head 400 is curved in two dimensions, i.e., so that, from its top or peak 400A, the contact head 400 slopes downward toward the front end 400B, slopes downward toward the read end 400C, slopes downward toward the left side 400D, and slopes downward toward the right side 400E. As such, from its top or peak 400A the contact head 400 slopes downward in all directions. The contact head 400 therefore may be considered to have an inverted "spoon" shape. The curved nature of the contact head 400 allows the contact head 400 to slide smoothly onto the desired electrical contact pad 310, and also allows the contact head 400 to slide smoothly over any intervening contact pads or printed circuit conductors that may be on the flexible circuit board 215, such as where two or three contacts 220 are serially aligned. Also, the curved nature of the contact head 400 allows the contact head 400 to slide in an axial direction (along the length of the electronic stylus 100) in order as well to slide in a "twist" or radial direction (around the central axis of the electronic stylus 100) to accommodate a twist-to-lock attachment of the cap 110 to the barrel 105.

The spring 410 allows the contact head 400 to bend radially inward (toward the feet 420A, 420B) as necessary during installation of the rigid circuit board 210 in the stylus 100, but provides radially outward pressure so that the curved head 400 is firmly in contact with the electrical contact pad 310 once the rigid circuit board 210 is installed. The radially outward pressure provided by the spring 410 also provides for the curved head 400 to stay in contact with the electrical contact pad 310 even when the stylus 100 is being used such that it is subject to vibration and/or acceleration by the user, such as when the user taps the stylus 100 on a display screen or a signature capture screen.

The spring 410 has a pick surface 410A, a U-shaped portion 410B, and opposing beams 410C1 and 410C2. The pick surface 410A is preferably approximately parallel to the surface of the rigid circuit board 210. This allows for use of a vacuum "pick-and-place" automated process to pick up the contact 220 and place it on the rigid circuit board 210 for soldering.

The connecting section 405 between the contact head 400 and the spring 410 allows for the contact head 400 to have a desired radial height above the feet 420A, 420B while the pick surface 410A remains approximately parallel to the surface of the rigid circuit board 210 so that the vacuum "pick-and-place" automated process can be used.

The top edge of the frame 415 is connected to the opposing beams 410C1, 410C2 of the spring 410. The bottom edge of the frame 415 has opposing legs 415A, 415B extending therefrom at opposite ends. The frame 415 and its legs 415A, 415B also allow for the contact head 400 to have a desired radial height above the feet 420A, 420B while the pick surface 410A remains approximately parallel to the surface of the rigid circuit board 210 so that the vacuum "pick-and-place" automated process can be used. The frame 415 allows the feet 420A, 420B to be designed to be placed as close as desired toward the sides of the rigid circuit board 210, thereby freeing up the valuable real estate in the center of the rigid circuit board 210 (from a side-to-side viewpoint) for placement of other SMT components. For example, referring briefly to FIG. 3, an SMT component 225A is shown as being outside of the legs on the rigid circuit board 210. If desired, the frame 415 could be made wider so that the feet were toward the edges of the rigid circuit board 210, and the SMT component 225A, like the SMT component 225B, was under the frame 415 or under one of the beams 410C1, 410C2.

The legs 415A, 415B provide for the bottom of the frame 415 to be at a desired height above the rigid circuit board 210 so as to provide a gap 425. The height of the legs 415A, 415B may be selected so that the gap 425 has a height sufficient that an SMT component 225B, such as a low profile SMT component, may be placed under the frame 415, thereby providing for efficient use of the real estate in the center of the rigid circuit board 210. A low profile SMT component or device preferably has a height of less than about 1.4 millimeters (mm), but the gap 425 could be selected to provide for a different height for the SMT component. Also, the height of the legs 415A, 415B and the height of the frame 415 may be selected so that an SMT component may be placed under the beams 410C1, 410C2 of spring 410.

The feet 420A, 420B preferably has a serpentine footprint, but can have a rectangular footprint. The serpentine footprint reduces the footprint size and allows for a smaller printed circuit board (PCB) solder pad on the rigid circuit board 210. The serpentine footprint also improves the balance of the contact 220 but uses less material than a rectangular footprint. Also, the feet 420A, 420B preferably have curled or curved tips 420A1, 420B1, respectively, which are typical for components which are produced on a reel and then cut prior to forming and installation. The use of a curved tip produces a larger filet on the front edge, which provides for a larger solder joint at the circuit board, and gives more strength to withstand shear along the axial direction. The feet 420A, 420B, the legs 415A, 415B, and the frame 415, also provide a conductive path, if needed, to connect a printed circuit conductor one on side of the rigid circuit board 210 to a printed circuit conductor on the other side of the rigid circuit board 210.

The beams 410C1, 410C2 of the spring 410 are connected to the frame 415. The use of two beams, rather than a single beam or plate (like pick surface 410A) is advantageous in that a tall SMT component can fit between the two beams 410C1, 410C2, so that the height of the tall SMT component is determined by the height of the contact head 400 above the surface of the rigid circuit board 210 rather than by the height of the beams 410C1, 410C2 above the surface of the rigid circuit board 210. Using the dimensions set forth below for the contact 220, a tall SMT component or device may have a height of up to about 4 mm.

The beams 410C1, 410C2 also act as springs during installation of the rigid circuit board 210 into the barrel 105 so that a rotational force (clockwise or counterclockwise as viewed into the barrel 105, such as may be applied during a twist-to-lock operation) does not permanently bend the contact 220 one way or the other. In addition, the pick surface 410A and/or the beams 410C1, 410C2 have lengths which position the contact head 400 such that the contact 220 is balanced; that is, the contact 220 does not have a tendency to fall forward or backward. This is a useful attribute for pick-and-place processing as an unbalanced component must be held in place to prevent it from falling over during a wave soldering operation. A single beam (not shown) could be used instead of two beams, but this would limit the height of an underlying SMT component. Also, unless such a single beam was rather thin and/or narrow, it might be too stiff to permit the contact head 400 to smoothly slide onto its designated electrical contact pad or to accommodate a twist-to-lock attachment of the cap 110 to the barrel 105.

During installation of the rigid circuit board 210 into the stylus 100, a minor misalignment of the machine performing the installation, the position of the barrel 105, or some other condition, might cause sufficient force to be exerted on the contact head 400, which force is then transmitted to the frame 415, to permanently bend the legs 415A, 415B, in which case the contact head 400 may not properly contact the electrical contact pad 310. To avoid this occurrence, one brace 430A preferably joins foot 420A, leg 415A, and the frame 415 together, and another brace 430B preferably joins foot 420B, leg 415B, and the frame 415 together. The braces 430A, 430B reduce the likelihood that the legs 415A, 415B will be bent during installation of the rigid circuit board 210 into the stylus 100.

The number of contacts 220 that may be used is primarily determined by considerations such as cost, the balance point of the electronic stylus, the length acceptable to the user, the weight acceptable to the user, inconvenience to the user caused by a very long stylus, etc. The contacts 220 can be made smaller, and/or with less space between them, so that more contacts 220 can be placed in series, but is the dimensions of the contacts 220 may also be limited by the strength and resilience needed for a contact 220 to remain aligned, to not become permanently bent, and to make a good electrical contact with the flexible circuit board 215, etc.

Although the description herein has been directed to use of the contacts and contact assemblies with a tubular container, such as an electronic stylus, the contacts may also be used in other environments. For example, the contacts may be used with a somewhat or completely flat or rectangular container, such as a cellular telephone, so that two parts of the cellular telephone may be easily separated and then rejoined, such as to replace a battery or a memory card, or for repairs. At least one part of the device would have a rigid circuit board with the contacts, thereon, and the other part of the device would have another circuit board designed to accept the contacts.

Figure 5:
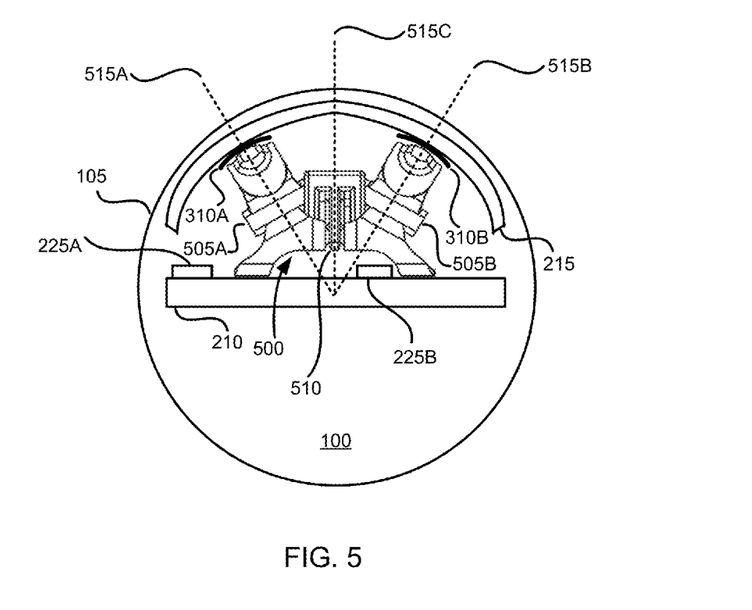
FIG. 5 is an illustration of an end view looking into the electronic stylus and showing an exemplary dual contact assembly.

FIG. 5 is an illustration of an end view looking into the electronic stylus 100 and showing a dual contact assembly 500 having contacts 505A, 505B, and an insulated spacer 510. Also shown are the rigid circuit board 210, the flexible circuit board 215, and exemplary SMT devices 225A, 225B. The dual contact assembly 500 provides two electrical paths between the circuit boards 210, 215, which allow the circuit boards 210, 215 to exchange information, instructions, and/or power. One dual contact assembly 500 is shown; other dual contact assemblies, which would be behind the dual contact assembly 500 which is shown, are not visible in this end view. The contact heads of the contacts 505A, 505B are radially inward from their respective electrical contact pads 310A, 310B, as indicated by the radial lines 515A, 515B, respectively. Also, the insulated spacer 510 is radially inward from the barrel 105 of the stylus 100, as indicated by the radial line 515C. The insulated spacer 510 is preferably a unitary component and is made from plastic, polycarbonate, or a liquid crystal polymer.

Figure 6A:
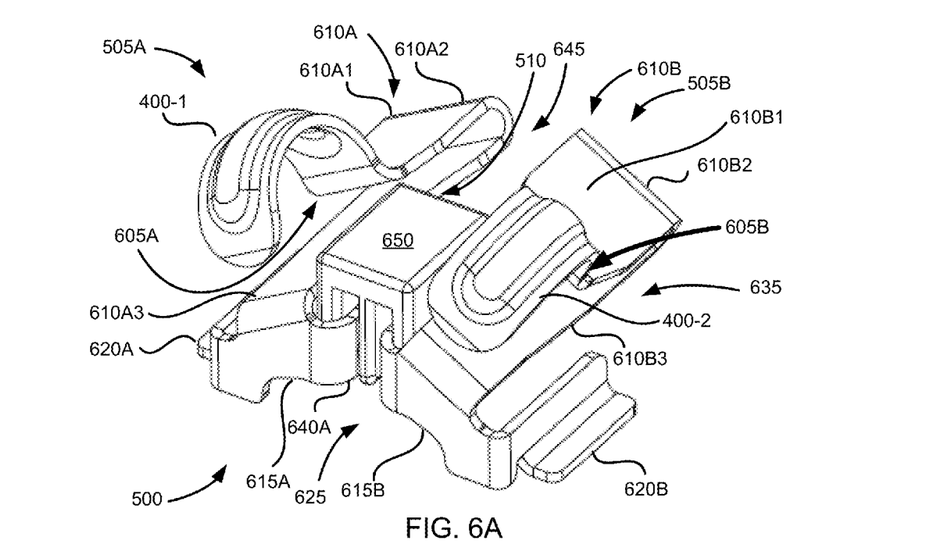
FIGS. 6A and 6B are perspective and bottom view illustrations, respectively, of an exemplary dual contact assembly.
Figure 6B:
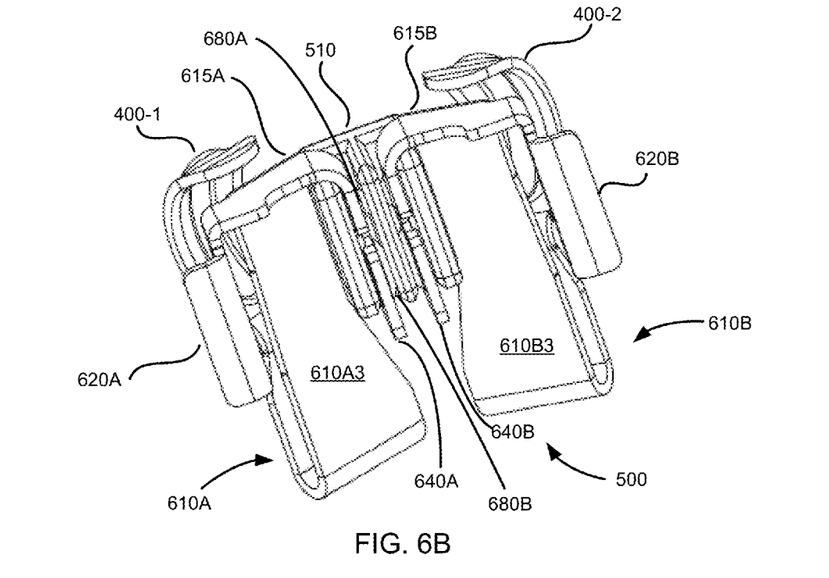

FIGS. 6A and 6B are perspective and bottom view illustrations, respectively, of a dual contact assembly 500. The dual contact assembly 500 has a pair of contacts 505A, 505B, and an insulated spacer 510. The top 650 of the insulated spacer 510 serves as the pick surface for pick-and-place operations. The contact heads 400-1, 400-2 of the contacts 505A, 505B are radially inward from their corresponding electrical contact pads 310A, 310B on the flexible circuit board 215. The insulated spacer 510 is approximately centered between the feet 620A, 620B so that it is radially inward from the barrel 105.

Each contact 505A, 505B is conductive and has a corresponding contact head 400-1, 400-2, a spring 610A, 610B, a connecting section 605A, 605B between the contact head 400-1, 400-2, and the spring 610A, 610B, has a frame 615A, 615B, a foot 620A, 620B, and a retaining arm 640A, 640B. The feet 620A, 620B are connected to the frames 615A, 615B in opposition to the retaining arms 640A, 640B, that is, they are on the opposite side of the frames 615A, 615B with respect to the retaining arms 640A, 640B. The feet 620A, 620B are soldered to respective electrical contact pads (not shown) on the rigid circuit board 210 by, for example, wave soldering. When the rigid circuit board 210 is inserted into the stylus 100, the contact heads 400-1, 400-2 are in contact with their respective electrical contact pads 310A, 310B on the flexible circuit board 215, thereby establishing two electrical communication paths between the two circuit boards 210, 215.

The contact heads 400-1, 400-2 are preferably curved like the contact head 400, and for the same reasons. The springs 610A, 610B correspond to and operate similarly to the spring 410. They allow their respective contact heads 400-1, 400-2 to bend radially inward as necessary during installation of the rigid circuit board 210 in the stylus 100, but provide radially outward pressure so that the curved contact heads 400-1, 400-2 are firmly in contact with their respective electrical contact pads 310A, 310B once the rigid circuit board 210 is installed. The radially outward pressure provided by the springs 610A, 610B also provide for their respective curved heads 400-1, 400-2 to stay in contact with their respective electrical contact pads 310A, 310B even when the stylus 100 is being used and is subject to vibration and/or acceleration by the user, such as when the user taps the stylus on a display screen or a signature capture screen.

Each spring 610A, 610B has a corresponding first flat surface or beam 610A1, 610B1, a U-shaped portion 610A2, 610B2, and a second flat surface or beam 610A3, 610B3. The flat surfaces or beams 610A1, 610B1, 610A3, 610B3 are preferably approximately radially inward from the electrical contact pads 310A, 310B on the flexible circuit board 215.

The connecting sections 605A, 605B between the corresponding contact heads 400-1, 400-2 and springs 610A, 610B allow for the contact heads 400-1, 400-2 to have a desired radial height and pressure so as to firmly contact the electrical contact pads 310A, 310B.

The frames 615A, 615B also allow for their respective contact heads 400-1, 400-2 to have a desired radial height so as to firmly contact the electrical contact pads 310A, 310B. The frames 615A, 615B and the insulated spacer 510 allow the feet 620A, 620B to be placed toward the sides of the rigid circuit board 210, thereby freeing up the valuable real estate in the center of the rigid circuit board 210 (from a side-to-side viewpoint) for placement of other SMT components. For example, referring briefly to FIG. 5, an SMT component 225A is shown as being outside of the legs on the rigid circuit board 210. If desired, the frames 615A, 615B could be made wider so that the feet 620A, 620B were more toward the edges of the rigid circuit board 210, and the SMT component 225A, like the SMT component 225B, could be under the frame 415.

In addition, the frames 615A, 615B operate with the insulated spacer 510 to provide a gap 625. The dimensions of the frames 615A, 615B may be selected so that the gap 625 has a height sufficient that an SMT component 225B, such as a low profile SMT component, may be placed under the dual contact assembly 500, thereby providing for efficient use of the real estate in the center of the rigid circuit board 210. The feet 620A, 620B preferably have a serpentine footprint (as shown for feet 420A and 420B), but can have a rectangular footprint. Also, the springs 610A and 610B are preferably separated by a gap 645 which at least accommodates the width of a tall SMT device mounted on the rigid circuit board 210 so that the tall SMT device 225 can extend into the gap 645.

Figure 6C:
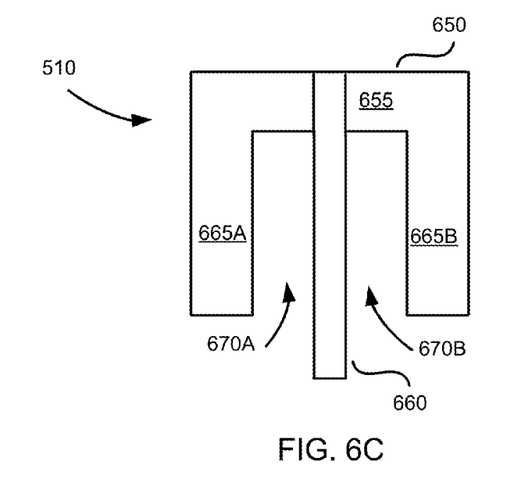
FIGS. 6C and 6D are end and perspective view illustrations of the insulated spacer of the exemplary dual contact assembly.
Figure 6D:
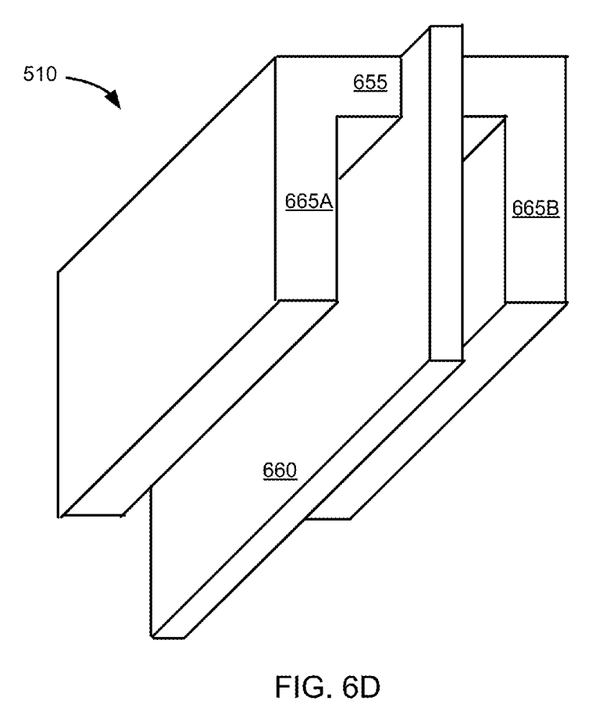

FIGS. 6C and 6D are illustrations of the insulated spacer 510 of the dual contact assembly 500. The insulated spacer 510 has an inner wall 660 and two outer walls 665A, 665B joined at a base 655. The inner wall 660 and the outer walls 665A, 665B define gaps 670A, 670B, respectively. The inner wall 660 is preferably, but not necessarily, taller and longer than the outer walls 665A, 665B. The insulated spacer 510 also has a substantially flat pick surface 650. This allows for use of a vacuum "pick-and-place" automated process to pick up the dual contact assembly 500 and place it on the rigid circuit board 210 for soldering.

The retaining arms 640A, 640B (FIGS. 6A, 6B), preferably have one or more bosses or protrusions 680A, 680B which serve to secure the contacts 505A, 505B and the insulated spacer 510 together. The insulated spacer 510 may also have one or more dimples (not shown) so that the bosses 680A, 680B lock the contacts 505A, 505B and the insulated spacer 510 together. Alternatively, the retaining arms 640A, 640B (FIG. 6B) may fit into gaps 670A, 670B in the insulated spacer 510, and the inner wall 660 may fit between the two retaining arms 640A, 640B, so that the components 505A, 505B, 510, are held together by a friction fit. Thus, the contacts 505A, 505B and the insulated spacer 510 form a dual contact assembly 500 which can be picked and placed as a single component on the circuit board 210.

In one implementation, each contact assembly 500 is treated as a separate component for the pick-and-place operation. Thus, three pick-and-place operations would be used to install three separate contact assemblies 500.

Figure 7A:
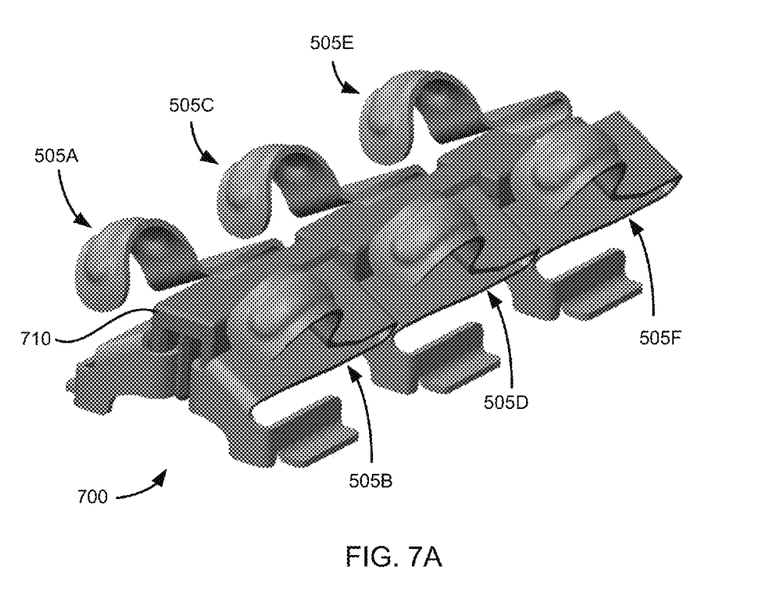
FIG. 7A illustrates an exemplary multiple contact assembly.

FIG. 7A illustrates an exemplary multiple contact assembly 700. In this implementation three pairs of contacts (505A and 505B, 505C and 505D, 505E and 505F) are joined to a single extended insulated spacer 710 to form a single component for a pick-and-place operation. Thus, only one pick-and-place operation is needed for multiple pairs of contacts, rather than one pick-and-place operation for each pair of contacts. The multiple contact assembly 700 has an inherently stable configuration so that the lengths of the beams 610B1, 610B3 may be almost any convenient length. The insulated spacer 710 is preferably a unitary component and is made from plastic, polycarbonate, or a liquid crystal polymer.

Figure 7B:
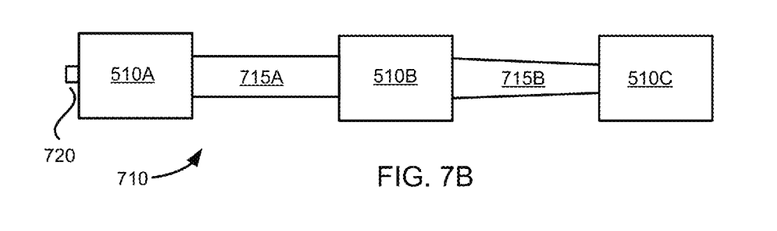
FIG. 7B is a top view of an exemplary extended insulated spacer.

FIG. 7B is a top view of an exemplary extended insulated spacer 710. The extended insulated spacer 710 has two or more spacers 510A, 510B, 510C, etc. The spacers 510A and 510B are connected via a joining section 715A, and the spacers 510B and 510C are connected via a joining section 715B. Two different types of joining sections 715A, 715B are shown. Joining section 715A has a uniform width. Joining section 715B has a tapered width. The extended insulated spacer 710 is approximately centered with respect to each pair of contacts (505A and 505B, 505C and 505D, 505E and 505F) so that it is radially inward from the barrel 105. Also, the contact heads of the contacts 505A-505F are radially inward from their corresponding electrical contact pads on the flexible circuit board 215.

Figure 7C:
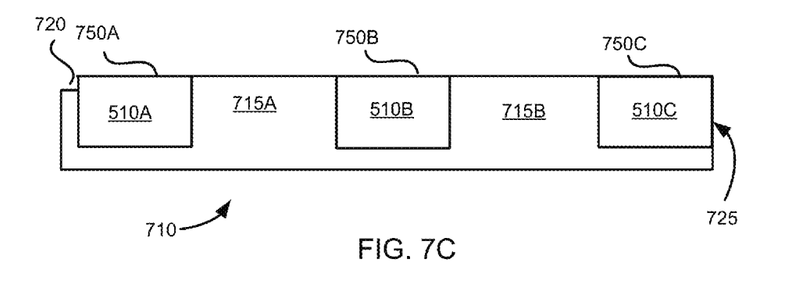
FIG. 7C is a side view of the exemplary extended insulated spacer.

FIG. 7C is a side view of the exemplary extended insulated spacer 710. In one implementation, the inner wall 660 (FIGS. 6C and 6D) may extend past an insulated spacer, such as insulated spacer 510A; in another implementation, the inner wall 660 ends flush 525 with an insulated spacer, such as insulated spacer 510C. The top 650A, 650B, 650C of each spacer 510A, 510B, 510C is preferably flat to provide for pick-and-place operations.

The contacts 220, 505 are preferably made from stainless steel, formed by a stamping process, and selectively post-plated with gold on the contact heads 400, 400-1, 400-2, and the feet 420A, 420B, 620A, 620B. The feet 620A, 620B can be turned inward (toward the insulated frame 510, 710 if desired, rather than outward (as shown in FIGS. 6A and 6B).

In one exemplary implementation for use in an electronic stylus 100, the following dimensions are used. A contact 220 has a height of 4.20 mm, a width of 5.1 mm, a length of 4.2 mm, and a thickness of 0.125 mm before plating. The length from the front end of the contact head 400 to the rear of the U-shaped portion 410B is 4.28 mm. The contact head 400 has a length of 2.31 mm, a width of 1.66 mm, and a radius of 80.90 mm. The connecting section 405 has a radius of 0.33 mm and has a width of 1.04 mm at its narrowest point. The U-shaped portion 410 has a radius of 0.30 mm. Each beam 410C1, 410C2 has width of 0.6 mm. The frame 415 has a bottom width of 2.00 mm and a radius of 2.00 mm to its top edge. The length from the front of frame 415 to the rear of the U-shaped portion 410B is 4.13 mm. The gap 425 has a height of 0.50 mm. A foot 420A, 420B, and its respective tip 420A1, 420B1, has a length of 2.55 mm and a width of 0.60 mm. The height from the bottom of a foot 420A, 420B to the top of its respective tip 420A1, 420B1 is 0.53 mm. The height from the bottom of a foot 420A, 420B to the bottom of a beam 410C1, 410C2 is 1.70 mm. The serpentine indents on the inside of a foot 420A, 420B have a radius of 0.15 mm, and the indents on the outside of a foot 402A, 420B have a radius of 0.20 mm.

The contacts 505A, 505B have a length of 4.60 mm from the front of the contact head 400-1, 400-2 to the rear of the U-shaped portion 610A2, 610B2. The distance between the outside edges of the feet 620A and 620B is 4.80 mm. The height between the bottom of a foot 620A, 620B and the highest radial part of its respective contact head 400-1, 400-2 is 3.40 mm.

Contacts 220, 505 have a minimum base metal plating of 1.27 micrometers (μm) of electroless nickel plating on all surfaces. A contact head 400, 400-1, 400-2 also has a minimum plating of palladium-nickel of 0.75 μm, and a minimum hard gold plating of 0.70 μm. The bottom of a foot 420A, 420B, 620A, 620B also has a minimum gold plating of 0.05 μm.

Some benefits and features provided by the contacts and contact assemblies described herein include: an SMT pick surface; suitability for SMT pick-and-place operations; lateral stability of the contacts; the curved contact head reduces or eliminates damage to the contacts and/or the flexible circuit board when the rigid circuit board is installed in the electronic stylus; the curved contact head slides smoothly onto the assigned electrical contact pad when the rigid circuit board is installed in the electronic stylus; the curved contact head slides smoothly over intervening printed circuit conductors when the rigid circuit board is installed in the electronic stylus; the spring reduces damages to the contacts and/or the flexible circuit board when the rigid circuit board is installed in the electronic stylus; the attachment feet may be placed toward the side of the rigid circuit board to preserve the center area of the rigid circuit board for SMT and other components; both low profile and tall SMT components may be placed under the contacts; low profile SMT components may be placed under the contact assemblies; the serpentine design of the feet allow for smaller solder pads on the rigid circuit board; the curled tips of the feet allow for smaller solder pads on the rigid circuit board; and the dual beams (split center beam) provides for improved lateral stability; uniform stress over the contact; and a reduced spring rate for the contact.

It is not necessary to use all techniques described herein in order to obtain any benefit or feature described herein. Also, it is not necessary to obtain all benefits or features described herein in order to obtain any benefit or feature described herein. In other words, one can choose to obtain only one benefit or feature, or to obtain more than one of the benefits or features, and can choose to implement one technique or method that provides the chosen benefit(s) and/or feature(s) and to not implement other techniques or methods described herein.

Although the description refers to circuit board 215 as being a flexible circuit board, that is merely one implementation. The circuit board 215 may be a rigid, curved circuit board, such as a laser deposition sintered ("LDS") circuit board. It should be appreciated that the various software components described herein can be implemented using or in conjunction with binary executable files, dynamically linked libraries (DLLs), APIs, network services, script files, interpreted program code, software containers, object files, bytecode suitable for just-in-time ("JIT") compilation, and/or other types of program code that can be executed by a processor to perform the operations described herein. Other types of software components not specifically mentioned herein can also be utilized.

In view of the above, the disclosure presented herein also encompasses the subject matter set forth in the following clauses.

Clause 1. A contact, comprising: a contact head adapted to make electrical contact with an electrical contact pad on a first circuit board, the contact head having a top, a front end, and a rear end, and being curved such that the top is higher than the front end and higher than the rear end; a spring having a pick surface at a first end, opposing first and second beams at a second end, and a U-shaped portion between the pick surface and the first and second beams, the pick surface being connected to the contact head; a frame having a top edge, and a bottom edge, the top edge being connected to the first and second beams of the spring, the bottom edge having opposing first and second legs; and a first foot connected to the first leg and a second foot connected to the second leg, the first foot and the second foot each adapted to be soldered to respective electrical contact pads on the second circuit board.

Clause 2. The contact of clause 1 wherein the contact head has a left side and a right side, and is curved such that the top is higher than the left side and higher than the right side.

Clause 3. The contact of any of clauses 1-2 and further comprising a connecting section interposed between the contact head and the pick surface of the spring.

Clause 4. The contact of any of clauses 1-3 and further comprising a first brace connected to the first foot, the first leg, and the frame, and a second brace connected to the second foot, the second leg, and the frame.

Clause 5. The contact of any of clauses 1-4 and further comprising at least one of: a first curved tip at a distal end of the first foot, or a second curved tip at a distal end of the second foot.

Clause 6. The contact of any of clauses 1-5 wherein at least one of the first foot or the second foot has a serpentine design.

Clause 7. The contact of any of clauses 1-6 wherein the first leg and the second leg raise the bottom edge of the frame to a height above the second circuit board such that a low profile surface mount technology device may be mounted on the second circuit board at least partially under the frame.

Clause 8. The contact of any of clauses 1-7 wherein the first leg, the second leg, and the frame raise the height of the first beam and the second beam above the second circuit board to a height above the second circuit board such that a surface mount technology device may be mounted on the second circuit board at least partially under at least one of the first beam or the second beam.

Clause 9. The contact of any of clauses 1-8 wherein the first beam and the second beam are separated by at least a distance which accommodates the width of a surface mount technology device mounted on the second circuit board.

Clause 10. The contact of any of clauses 1-9 wherein the contact head is centered between the first foot and the second foot.

Clause 11. The contact of any of clauses 1-10 wherein the contact is balanced both in a front-to-back direction and in a side-to-side direction.

Clause 12. The contact of any of clauses 1-11 wherein at least one of the pick surface or the first and second beams position the contact head so that the contact is balanced.

Clause 13. The contact of any of clauses 1-12 wherein the contact has an exaggerated "S" shape.

Clause 14. The contact of any of clauses 1-13 wherein the contact is radially aligned with the electrical contact pad on the first circuit board when the contact is installed on the second circuit board, and the first circuit board and the second board are installed in a tubular-shaped container.

Clause 15. A contact assembly, comprising: a first contact comprising: a first contact head adapted to make electrical contact with a first electrical contact pad on a first circuit board, the first contact head having a top, a front end, and a rear end, and being curved such that the top of the first contact head is higher than the front end of the first contact head and higher than the rear end of the first contact head; a first spring having a first beam at a first end, a second beam at a second end, and a U-shaped portion between the first beam and the second beam, the first beam of the first spring being connected to the first contact head; a first frame connected to the second end of the first spring, and having a retaining arm extending therefrom; and a first foot connected to the first frame in opposition to the retaining arm of the first frame, and adapted to be soldered to a first electrical contact pad on a second circuit board; a second contact comprising: a second contact head adapted to make electrical contact with a second electrical contact pad on the first circuit board, the second contact head having a top, a front end, and a rear end, and being curved such that the top of the second contact head is higher than the front end of the second contact head and higher than the rear end of the second contact head; a second spring having a first beam at a first end, a second beam at a second end, and a U-shaped portion between the first beam of the second spring and the second beam of the second spring, the first beam of the second spring being connected to the second contact head; a second frame connected to the second end of the second spring, and having a retaining arm extending therefrom; and a second foot connected to the second frame in opposition to the retaining arm of the second frame, and adapted to be soldered to a second electrical contact pad on the second circuit board; and an insulated spacer, having a pick surface, a first leg, a second leg, and an inner leg, the inner leg being between the first leg and the second leg, the first leg and the inner leg defining a first gap, and the second leg and the inner leg defining a second gap, the retaining arm of the first frame having a thickness which retains the retaining arm of the first frame in the first gap, the retaining arm of the second frame having a thickness which retains the retaining arm of the second frame in the second gap.

Clause 16. The contact assembly of clause 15 wherein the first contact head has a left side and a right side, and is curved such that the top of the first contact head is higher than the left side of the first contact head and higher than the right side of the first contact head.

Clause 17. The contact assembly of any of clauses 15-16 and further comprising a connecting section interposed between the first contact head and the first beam of the first spring.

Clause 18. The contact assembly of any of clauses 15-17 wherein the first frame and the second frame raise the bottom edge of the insulated spacer to a height above the second circuit board such that a low profile surface mount technology device may be mounted on the second circuit board at least partially under the insulated spacer.

Clause 19. The contact assembly of any of clauses 15-18 wherein the first frame raises the second beam of the first spring to a height above the second circuit board such that a low profile surface mount technology device may be mounted on the second circuit board at least partially under the second beam of the first spring.

Clause 20. The contact assembly of any of clauses 15-19 wherein the first spring and the second spring are separated by at least a distance which accommodates the width of a surface mount technology device mounted on the second circuit board.

Clause 21. The contact assembly of any of clauses 15-20 wherein at least one of: the first beam of the first spring positions the first contact head so that the contact assembly is balanced; or the second beam of the first spring positions the first contact head so that the contact assembly is balanced.

Clause 22. The contact assembly of any of clauses 15-21 wherein the insulated spacer is centered between the first contact and the second contact.

Clause 23. The contact assembly of any of clauses 15-22 wherein the first contact is radially aligned with the first electrical contact pad on the first circuit board when the contact assembly is installed on the second circuit board, and the first circuit board and the second board are installed in a tubular-shaped container.

Clause 24. The contact assembly of any of clauses 15-23 wherein the insulated spacer is radially aligned with the first circuit board when the contact assembly is installed on the second circuit board, and the first circuit board and the second board are installed in a tubular-shaped container.

Clause 25. A contact assembly, comprising: a first contact comprising: a first contact head adapted to make electrical contact with a first electrical contact pad on a first circuit board, the first contact head having a top, a front end, and a rear end, and being curved such that the top of the first contact head is higher than the front end of the first contact head and higher than the rear end of the first contact head; a first spring having a first beam at a first end, a second beam at a second end, and a U-shaped portion between the first beam and the second beam, the first beam of the first spring being connected to the first contact head; a first frame connected to the second end of the first spring, and having a retaining arm extending therefrom; and a first foot connected to the first frame in opposition to the retaining arm of the first frame, and adapted to be soldered to a first electrical contact pad on a second circuit board; a second contact comprising: a second contact head adapted to make electrical contact with a second electrical contact pad on the first circuit board, the second contact head having a top, a front end, and a rear end, and being curved such that the top of the second contact head is higher than the front end of the second contact head and higher than the rear end of the second contact head; a second spring having a first beam at a first end, a second beam at a second end, and a U-shaped portion between the first beam of the second spring and the second beam of the second spring, the first beam of the second spring being connected to the second contact head; a second frame connected to the second end of the second spring, and having a retaining arm extending therefrom; and a second foot connected to the second frame in opposition to the retaining arm of the second frame, and adapted to be soldered to a second electrical contact pad on the second circuit board; and a third contact comprising: a third contact head adapted to make electrical contact with a third electrical contact pad on the first circuit board, the third contact head having a top, a front end, and a rear end, and being curved such that the top of the third contact head is higher than the front end of the third contact head and higher than the rear end of the third contact head; a third spring having a first beam at a first end, a second beam at a second end, and a U-shaped portion between the first beam and the second beam, the first beam of the first spring being connected to the first contact head; a third frame connected to the second end of the third spring, and having a retaining arm extending therefrom; and a third foot connected to the third frame in opposition to the retaining arm of the third frame, and adapted to be soldered to a third electrical contact pad on a second circuit board; a fourth contact comprising: a fourth contact head adapted to make electrical contact with a fourth electrical contact pad on the first circuit board, the fourth contact head having a top, a front end, and a rear end, and being curved such that the top of the fourth contact head is higher than the front end of the fourth contact head and higher than the rear end of the fourth contact head; a fourth spring having a first beam at a first end, a second beam at a second end, and a U-shaped portion between the first beam of the fourth spring and the second beam of the fourth spring, the first beam of the fourth spring being connected to the fourth contact head; a fourth frame connected to the second end of the fourth spring, and having a retaining arm extending therefrom; and a fourth foot connected to the fourth frame in opposition to the retaining arm of the fourth frame, and adapted to be soldered to a fourth electrical contact pad on the second circuit board; and an extended insulated spacer, comprising: a first insulated spacer, having a pick surface, a first leg, a second leg, and an inner leg, the inner leg being between the first leg and the second leg, the first leg and the inner leg defining a first gap, and the second leg and the inner leg defining a second gap, the retaining arm of the first frame having a thickness which retains the retaining arm of the first frame in the first gap, the retaining arm of the second frame having a thickness which retains the retaining arm of the second frame in the second gap; a second insulated spacer, having a pick surface, a first leg, a second leg, and an inner leg, the inner leg being between the first leg and the second leg, the first leg and the inner leg defining a first gap, and the second leg and the inner leg defining a second gap, the retaining arm of the third frame having a thickness which retains the retaining arm of the third frame in the first gap, the retaining arm of the fourth frame having a thickness which retains the retaining arm of the fourth frame in the second gap; and a joining section joining the first insulated spacer and the second insulated spacer.

Clause 26. The contact assembly of clause 25 wherein the joining section has a uniform width along its length.

Clause 27. The contact assembly of any of clauses 25-26 wherein the joining section has a width which tapers along its length.

Clause 28. The contact assembly of any of clauses 25-27 wherein the first contact head has a left side and a right side, and is curved such that the top of the first contact head is higher than the left side of the first contact head and higher than the right side of the first contact head.

Clause 29. The contact assembly of any of clauses 25-28 and further comprising a connecting section interposed between the first contact head and the first beam of the first spring.

Clause 30. The contact assembly of any of clauses 25-29 wherein the first frame and the second frame raise the bottom edge of the insulated spacer to a height above the second circuit board such that a low profile surface mount technology device may be mounted on the second circuit board at least partially under the insulated spacer.

Clause 31. The contact assembly of any of clauses 25-30 wherein the first frame raises the second beam of the first spring to a height above the second circuit board such that a low profile surface mount technology device may be mounted on the second circuit board at least partially under the second beam of the first spring.

Clause 32. The contact assembly of any of clauses 25-31 wherein the first spring and the second spring are separated by at least a distance which accommodates the width of a surface mount technology device mounted on the second circuit board.

Clause 33. The contact assembly of any of clauses 25-32 wherein at least one of: the first beam of the first spring positions the first contact head so that the contact assembly is balanced; or the second beam of the first spring positions the first contact head so that the contact assembly is balanced.

Clause 34. The contact assembly of any of clauses 25-33 wherein the insulated spacer is centered between the first contact and the second contact.

Clause 35. The contact assembly of any of clauses 25-34 wherein the first contact is radially aligned with the first electrical contact pad on the first circuit board when the contact assembly is installed on the second circuit board, and the first circuit board and the second board are installed in a tubular container.

Clause 36. The contact assembly of any of clauses 25-35 wherein the insulated spacer is radially aligned with the first circuit board when the contact assembly is installed on the second circuit board, and the first circuit board and the second board are installed in a tubular-shaped container.

Clause 37. An electronic device, such as an electronic stylus, comprising: a rigid circuit board containing one or more SMT components thereon, a flexible circuit board, and one or more contacts as in any of clauses 1-14.

Clause 38. The electronic device of clause 37 and further comprising a case, such as a barrel and a cap, and, optionally, one or more buttons on the barrel or on the cap.

Clause 39. The electronic device of any of clauses 37 or 38 wherein the rigid circuit board is mounted in the barrel.

Clause 40. An electronic device, such as an electronic stylus, comprising: a case, such as a barrel and a cap, a battery, a rigid circuit board containing one or more SMT components thereon, a flexible circuit board, and one or more contact assemblies as in any of clauses 15-24.

Clause 41. The electronic device of clause 40 and further comprising a case, such as a barrel and a cap, and, optionally, one or more buttons on the barrel or on the cap.

Clause 42. The electronic device of any of clauses 41 or 42 wherein the rigid circuit board is mounted in the barrel.

Clause 43. An electronic device, such as an electronic stylus, comprising: a case, such as a barrel and a cap, a battery, a rigid circuit board containing one or more SMT components thereon, a flexible circuit board, and a contact assembly as in any of clauses 25-36.

Clause 44. The electronic device of clause 43 and further comprising a case, such as a barrel and a cap, and, optionally, one or more buttons on the barrel or on the cap.

Clause 45. The electronic device of any of clauses 43 or 44 wherein the rigid circuit board is mounted in the barrel.

Technologies for SMT compatible electrical contacts useful to connect circuit boards in a tubular-shaped device, such as an electronic stylus, have been disclosed herein. Although the subject matter presented herein has been described in language specific to structural features and construction, it is to be understood that the description above is provided by way of illustration or example only, and should not be construed as limiting. Rather, the specific features and construction are disclosed as example forms of implementing the claims and various modifications and changes can be made to the implementations described herein while still being within the true spirit and scope of the claims. Further, it should be appreciated that the above-described subject matter can be implemented to connect circuit boards which are not in a tubular-shaped device. Therefore, the subject matter defined in the appended claims is not necessarily limited to the specific features and construction described herein.

What is claimed is:

1. A contact, comprising:
  a contact head adapted to make electrical contact with an electrical contact pad on a first circuit board, the contact head having a top, a front end, and a rear end, and being curved such that the top is higher than the front end and higher than the rear end;
  a spring having a pick surface at a first end, opposing first and second beams at a second end, and a U-shaped portion between the pick surface and the first and second beams, the pick surface being connected to the contact head;
  a frame having a top edge, and a bottom edge, the top edge being connected to the first and second beams of the spring, the bottom edge having opposing first and second legs; and
  a first foot connected to the first leg and a second foot connected to the second leg, the first foot and the second foot each adapted to be soldered to respective electrical contact pads on a second circuit board.

2. The contact of claim 1 wherein the contact head has a left side and a right side, and is curved such that the top is higher than the left side and higher than the right side.

3. The contact of claim 1 wherein the first leg and the second leg raise the bottom edge of the frame to a height above the second circuit board such that a low profile surface mount technology device may be mounted on the second circuit board at least partially under the frame.

4. The contact of claim 1 wherein the first leg, the second leg, and the frame raise the height of the first beam and the second beam above the second circuit board to a height above the second circuit board such that a surface mount technology device may be mounted on the second circuit board at least partially under at least one of the first beam or the second beam.

5. The contact of claim 1 wherein the first beam and the second beam are separated by at least a distance which accommodates the width of a surface mount technology device mounted on the second circuit board.

6. The contact of claim 1 wherein the contact head is centered between the first foot and the second foot.

7. The contact of claim 1 wherein the contact is balanced both in a front-to-back direction and in a side-to-side direction.

8. The contact of claim 1 wherein the contact has an exaggerated "S" shape.

9. The contact of claim 1 wherein the contact is radially aligned with the electrical contact pad on the first circuit board when the contact is installed on the second circuit board, and the first circuit board and the second board are installed in a tubular-shaped container.

10. A contact assembly, comprising:
  a first contact and a second contact, each contact comprising:
    a contact head adapted to make electrical contact with a corresponding electrical contact pad on a first circuit board, the contact head having a top, a front end, and a rear end, and being curved such that the top of the contact head is higher than the front end of the contact head and higher than the rear end of the contact head;
    a spring having a first beam at a first end, a second beam at a second end, and a U-shaped portion between the first beam and the second beam, the first beam being connected to the contact head;
    a frame connected to the second beam, the frame having a retaining arm extending therefrom; and
    a foot connected to the frame in opposition to the retaining arm of the frame, and adapted to be soldered to a corresponding electrical contact pad on a second circuit board; and
  an insulated spacer, having a pick surface, a first wall, a second wall, and an inner wall, each wall being connected to the pick surface, the inner wall being between the first wall and the second wall, the first wall and the inner wall defining a first gap, the second wall and the inner wall defining a second gap, the retaining arm of the first contact being retained in the first gap, and the retaining arm of the second contact being retained in the second gap.

11. The contact assembly of claim 10 wherein the first contact head has a left side and a right side, and is curved such that the top of the first contact head is higher than the left side of the first contact head and higher than the right side of the first contact head.

12. The contact assembly of claim 10 wherein the frame of the first contact and the frame of the second contact raise the bottom edge of the insulated spacer to a height above the second circuit board such that a low profile surface mount technology device may be mounted on the second circuit board at least partially under the insulated spacer.

13. The contact assembly of claim 10 wherein the frame of the first contact raises the second beam of the first contact to a height above the second circuit board such that a low profile surface mount technology device may be mounted on the second circuit board at least partially under the second beam of the first contact.

14. The contact assembly of claim 10 wherein at least one of:
  the first beam of the first contact positions the first contact head so that the contact assembly is balanced; or
  the second beam of the first contact positions the first contact head so that the contact assembly is balanced.

15. The contact assembly of claim 10 wherein the insulated spacer is centered between the first contact and the second contact.

16. The contact assembly of claim 10 wherein the first contact is radially aligned with the first electrical contact pad on the first circuit board when the contact assembly is installed on the second circuit board, and the first circuit board and the second board are installed in a tubular-shaped container.

17. The contact assembly of claim 10 wherein the insulated spacer is radially aligned with the first circuit board when the contact assembly is installed on the second circuit board, and the first circuit board and the second board are installed in a tubular-shaped container.

18. A contact assembly, comprising:
a first contact, a second contact, a third contact, and a fourth contact, each contact comprising:
  a contact head adapted to make electrical contact with a corresponding electrical contact pad on a first circuit board, the contact head having a top, a front end, and a rear end, and being curved such that the top of the contact head is higher than the front end of the contact head and higher than the rear end of the contact head;
  a spring having a first beam at a first end, a second beam at a second end, and a U-shaped portion between the first beam and the second beam, the first beam being connected to the contact head;
  a frame having a retaining arm extending therefrom, the frame being connected to the second beam; and
  a foot connected to the frame in opposition to the retaining arm, and adapted to be soldered to a corresponding electrical contact pad on a second circuit board; and
an extended insulated spacer, comprising:
  a first insulated spacer and a second insulated spacer, each insulated spacer comprising a pick surface, a first wall, a second wall, and an inner wall, each wall being connected to the pick surface, the inner wall being between the first wall and the second wall, the first wall and the inner wall defining a first gap, and the second wall and the inner wall defining a second gap;
  wherein the retaining arm of the first contact is retained in the first gap of the first insulated spacer, the retaining arm of the second contact is retained in the second gap of the first insulated spacer, the retaining arm of the third contact is retained in the first gap of the second insulated spacer, and the retaining arm of the fourth contact is retained in the second gap of the second insulated spacer; and
  a joining section joining the first insulated spacer and the second insulated spacer.

19. The contact assembly of claim 18 wherein the joining section has a uniform width along its length.

20. The contact assembly of claim 18 wherein the joining section has a width which tapers along its length.

* * * * *